United States Patent [19]

Sotom

[11] Patent Number: 5,485,297

[45] Date of Patent: Jan. 16, 1996

[54] OPTICAL SWITCHING MATRIX

[75] Inventor: Michel Sotom, Paris, France

[73] Assignee: Alcatel N.V., Amsterdam

[21] Appl. No.: 244,610

[22] PCT Filed: Oct. 9, 1992

[86] PCT No.: PCT/FR93/01006

§ 371 Date: Jun. 3, 1994

§ 102(e) Date: Jun. 3, 1994

[87] PCT Pub. No.: WO94/09602

PCT Pub. Date: Apr. 28, 1994

[30] Foreign Application Priority Data

Oct. 9, 1992 [FR] France .................................. 92 12018

[51] Int. Cl.$^6$ .......................... H04J 14/02; H04B 10/207
[52] U.S. Cl. .......................... 359/123; 359/117; 359/121; 359/128
[58] Field of Search ..................................... 359/117, 123, 359/120, 121, 124, 125, 127, 128, 130

[56] References Cited

U.S. PATENT DOCUMENTS

| | | | |
|---|---|---|---|
| 4,873,681 | 10/1989 | Arthurs et al. ............................ | 359/123 |
| 5,241,409 | 8/1993 | Hill et al. .................................. | 359/117 |

FOREIGN PATENT DOCUMENTS

| | | |
|---|---|---|
| 0492852A3 | 7/1992 | European Pat. Off. . |
| WO9210770 | 6/1992 | WIPO . |

OTHER PUBLICATIONS

M. Akiyama et al "Photonic Switching System", *Transactions Of The Institute Of Electronics, Information And Communication Engineers of Japan*, vol. 74, No. 1, Jan. 1991, pp. 84–91.

C. A. Brackett, "Dense Wavelength Division Multiplexing Networks: Principles and Applications", *IEEE Journal On Selected Areas In Communication*, vol. 8, No. 6, Aug. 1990 pp. 948–964.

A. M. Hill, "A Distributed Wavelength Switching Architecture for the TPON Local Network", *Proceedings, International Switching Symposium*, May 27–Jun. 1, 1990, vol. III, pp. 21–26.

H. Obara et al, "Star Coupler Based WDM Switch Employing Tunable Device with Reduced Tunability Range", *Electronics Letters*, vol. 28, No. 13, Jun. 18, 1992, pp. 1268–1270.

M. Fujiwara et al, "Line Capacity Expansion Schemes in Photonic Switching", *IEEE Transactions On Parallel And Distributed Systems*, vol. 1, No. 2, May 1990 pp. 47–53.

*Primary Examiner*—Leslie Pascal
*Attorney, Agent, or Firm*—Sughrue, Mion, Zinn, Macpeak & Seas

[57] ABSTRACT

On the input side of the matrix, a set of emitters (E1,1, ..., Em,n) receive data to be transmitted via the matrix. The set of emitters emit waves carrying the data at controlled wavelengths. A set of filters (F1,1, ..., Fn,m) transmit the waves at the output of the matrix selectively as a function of the wavelengths of the waves. The waves are transmitted from the emitters to the filters firstly via a group of switching distributors (X1, ..., Xm), each of which is capable of connecting each of its inputs to each of its outputs on command, and secondly via a group of star distributors (C1, ..., Cn), each of which permanently connects all of its inputs to all of its outputs. A particular application of the invention is to a telecommunications network when a data collection operation is to be performed simply.

3 Claims, 3 Drawing Sheets

OPTICAL SWITCHING MATRIX

BACKGROUND OF THE INVENTION

The present invention relates to an optical switching matrix that can be used in particular in an exchange or node of an optical fiber data-transmission network. The matrix can also be used in any other routing member of such a network.

Such a matrix includes inputs and outputs, each input receiving data to transmitted, and each output transmitting, from the matrix, that data which is received via the input to which the output is temporarily connected. Switching signals are received by the matrix so as to control the beginning and the end of the period during which the output is connected to the input. Inside the matrix, data to be transmitted is carried by light waves.

An important characteristic of such a matrix is its ability to perform data collection operations easily when necessary, so as to collect a plurality of different items of data which are received via a plurality of respective inputs, and which are all to be transmitted to the same output.

A first known optical switching matrix includes the following elements (see FIG. 1):

a number Z of light emitters such as the emitter 100$i$, the entire set of emitters being designated by the reference 100; each of the emitters has a wavelength at which it emits a carrier light wave; the wave is modulated by data to be transmitted that is received by the emitter, e.g. in electrical form; the emitters constitute tuned members that are tuned to wavelengths;

a wave distributor 102; such a distributor is provided both with Z inputs respectively connected to Z emitters 100 and also with Z outputs, and it is referred to below as a "star distributor"; it permanently transmits a fraction of a mixture constituted by all the waves that it receives at its inputs to each of its outputs; such a distributor is often referred to in the literature as a "star coupler"; and Z filters such as 104$j$, given the overall reference 104 and respectively connected to the Z outputs of the distributor 102; such a filter has a wavelength and constitutes a tuned member that is tuned to that wavelength; it selectively transmits those waves whose carrier wavelengths are equal to its own wavelength; the filters such as 104 are referred to below as "fixed" filters to indicate that their wavelengths are fixed.

The emitters are referred to below as "controlled" emitters to indicate that their wavelengths are controlled as a function of the switching signals that are received by the matrix, so that when data to be transmitted is received by an emitter 100$i$ and when that data is to be transmitted in optical form to an output of a filter 104$j$ whose wavelength is L$j$, the emitter is tuned to that wavelength L$j$, i.e. the wavelength of the emitter is made equal to L$j$.

That first known matrix uses a technique referred to internationally as "wavelength routing". This technique is described in a document by Brackett entitled "Dense Wavelength Divisions Multiplexing Networks: Principles and Applications", Charles A Brackett, IEEE Journal on Selected Areas in Communications, Vol. 8, No. 6, August 1990 p 948–964.

That first known matrix may be referred to as a "wavelength-division" matrix because it uses different wavelengths of the optical spectrum.

A second known matrix is shown in FIG. 2, and may be referred to as a "space-division" matrix because it creates guided light paths that can be varied in three-dimensional space. For example, that matrix includes:

Z inputs 200 receiving data to be transmitted, the data being received in optical form;

Z outputs 204 transmitting the data in optical form; and a switching distributor 202 variably connecting the inputs to the outputs; to make the connections, the distributor receives switching signals which control the guided paths formed in the distributor between the inputs and the outputs; the paths are guided in the same way for waves that may have different wavelengths; such a distributor is well known and itself constitutes an optical switching matrix such as the matrix described in a document by Hermes entitled "Optical Routing— State of the art and future aspects", Thomas Hermes, Proceedings ECOC'86, pp 33–38; some such distributors enable data to be broadcast from one input to a plurality of outputs, while others enable data received via a plurality of inputs to be collected at one output.

Those known optical switching matrices suffer, in particular, from the drawback that their capacities are limited to values that are lower than those desired, their capacities being expressed in terms of numbers of inputs and of outputs. The capacity of a wavelength-division matrix is limited by the number of available carrier wavelengths. The available wavelengths are those lying in a wavelength band whose width is limited by various factors, such as the feasibility and cost of making the components, and the compatibility thereof with other members in the network. Said wavelengths must also be sufficiently far apart to avoid any cross-talk. The capacity of a space-division matrix is limited by the amount of space required for the guided paths which must be pre-established in the switching distributor. However, higher-capacity matrices can be constructed by associating limited-capacity matrix elements. But such associations require three successive stages of such matrix elements, so that any set of connections from among all the possible connections can be made simultaneously. This appears in the above-mentioned document by Hermes, and in a document by Clos entitled "A Study of Non-Blocking Switching Networks" Charles Clos, Bell System Technical Journal, Vol. 32, pp 406–424 (1953).

SUMMARY OF THE INVENTION

A particular object of the present invention is to provide an optical switching matrix that is simple to make and that is both high-capacity and compact, while enabling the matrix to be made solely using members that are available at limited cost, and enabling data collection to be performed easily when necessary.

To this end, the invention provides an optical switching matrix, the matrix including:

members tuned to optical wavelengths of the matrix, the members firstly forming a set of emitters receiving data to be transmitted and having tuning wavelengths at which they emit waves carrying the data, the members secondly forming a set of filters also having tuning wavelengths, each filter selectively transmitting the waves whose wavelengths are equal to its tuning wavelength; and a distributor having inputs and outputs for distributing the waves received at its inputs to its outputs, the distributor being connected between the set of emitters and the set of filters;

the matrix being characterized by the fact that it includes a plurality of said distributors firstly forming a group of switching distributors, each of which is capable of connecting each of its inputs to each of its outputs on command, the switching distributor inputs being connected to said emitters, and secondly forming a group of star distributors, each of which permanently connects all of its inputs to all of its outputs, the star distributor inputs being connected to the switching distributor outputs, and the star distributor outputs being connected to said filters.

BRIEF DESCRIPTION OF THE DRAWINGS

An embodiment of the invention is described below by way of non-limiting example and with reference to the accompanying drawings in which all the Figures show optical switching matrices, and in which.

DESCRIPTION OF THE PREFERRED EMBODIMENTS

Figure 1:
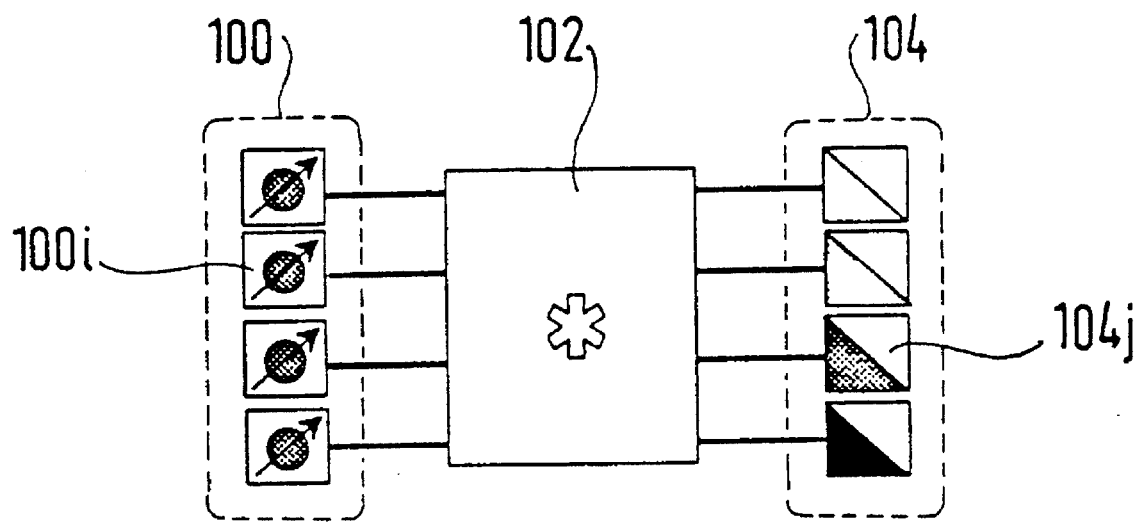
FIG. 1 shows a first known matrix that is described above.
Figure 2:
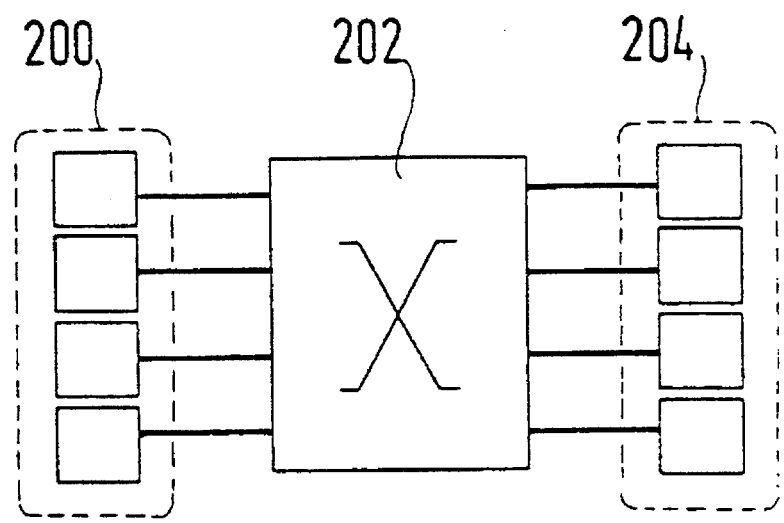
FIG. 2 shows a second known matrix that is described above.
Figure 3:
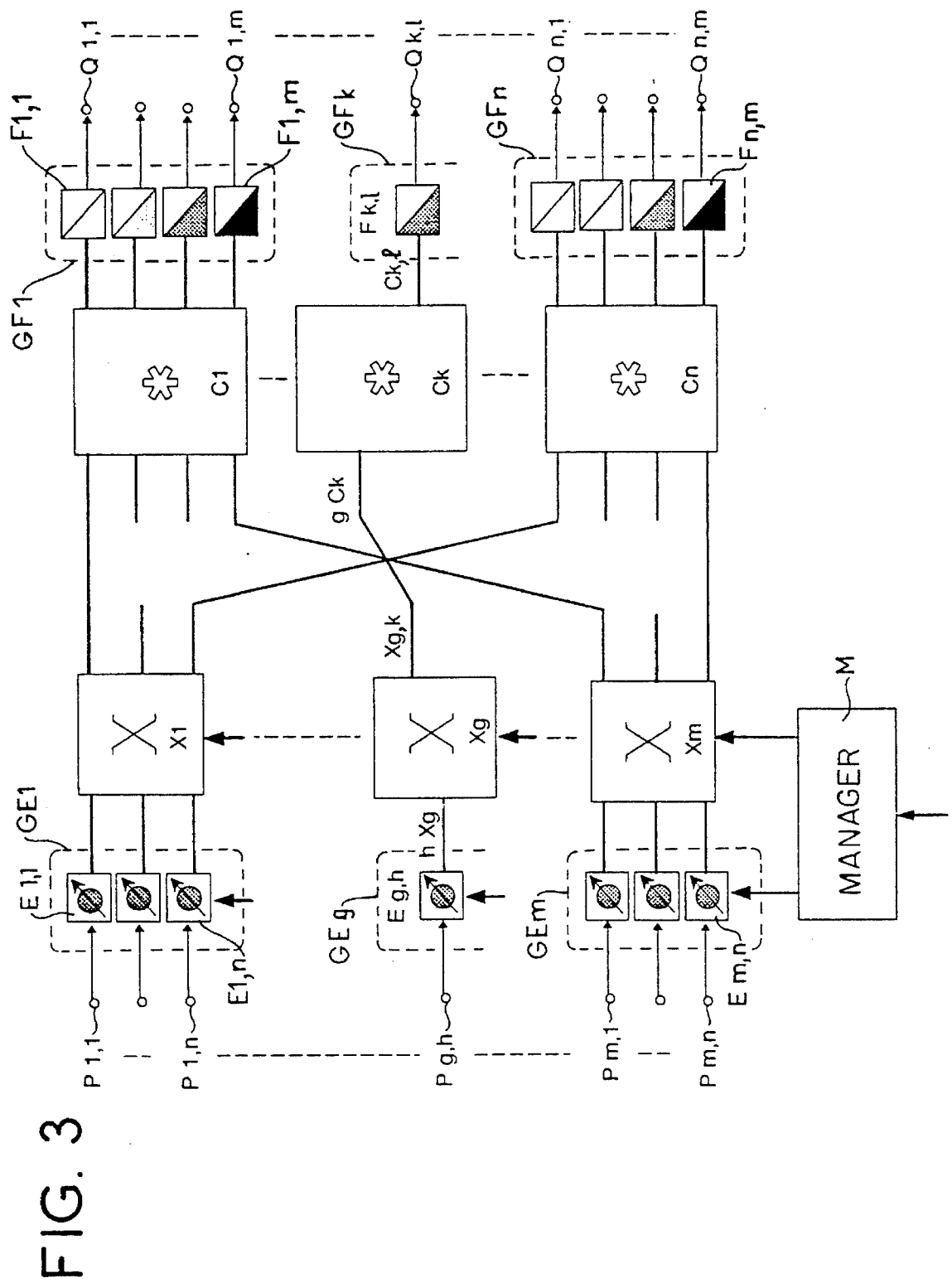
FIG. 3 shows a first matrix of the present invention.

The two matrices of the present invention use the same succession of carrier wavelengths. They include equivalent members which are indicated firstly in the description of the first one of the matrices, two members being referred to as "equivalent" when they perform the same functions optionally in co-operation with members that are themselves equivalent. The reference of a member in the second matrix includes the same upper-case letters as those of the equivalent member in the first matrix, with an apostrophe being added, e.g. the member C'1 in the second matrix is equivalent to the member C1 in the first matrix. The lowercase letters represent indices constituted by integers.

In the same way as the two above-described known matrices, each matrix of the present invention has the following elements:

a group of emitters $E1,1, \ldots, E1,n$ in succession and having ranks $1, \ldots, n$ in the group, each of said emitters being provided with an input $P1,1, \ldots, P1,n$ of the same rank for receiving data to be transmitted, the input constituting an input of the matrix, the emitter being controlled by the data so as to emit a light wave carrying the data and having one of said carrier wavelengths constituting a wavelength of the emitter, which wavelength is controlled, the emitter typically being constituted by a semiconductor laser;

a star distributor such as Ck including a succession of inputs such as $gCk$, each of which receives a light wave and has a rank such as in the succession, the distributor forming a mixture of all the waves and also including a succession of outputs such as $Ck,1$, each of the outputs having a rank such as 1 in the succession and transmitting a group of waves constituted by a fraction of the mixture; and a group of filters such as GF1, the group being constituted by filters $F1,1, \ldots, F1,m$ in succession and having ranks $1, \ldots, m$ in the group, each of the filters having a wavelength constituted by one of said carrier wavelengths to which the filter is tuned, each of the filters such as $Fk,1$ having an input connected to one of said outputs $Ck,1$ of one of a passive distributor Ck, the filter being provided with an output $Q1,1$ having the same rank as the filter and constituting an output of said matrix for selectively transmitting a wave at the output of the matrix, which wave has the same wavelength as the filter;

the matrix further including a management member M receiving switching signals associated with said data to be transmitted, the signals designating, for each such item of data received via an input such as $Pg,h$, at least one output such as $Qk,1$ of the matrix, which output is to transmit the item of data, the management member controlling the wavelengths of said emitters so that the item of data is in fact transmitted via the output which is designated in this way.

More specifically, according to the present invention, the matrix includes the following elements:

a set of emitters $E1,1, \ldots, Em,n$, the set being constituted by a succession of said groups of emitters GE1, GEm, in which succession the groups have ranks $1, \ldots, m$;

a group of switching distributors $X1, \ldots, Xm$ in succession, having ranks $1, \ldots, m$ in the group, each of which distributors such as Xg is capable of distributing said light waves, and includes a succession of inputs such as $hXg$ having ranks h in the succession, each switching distributor input being connected to that emitter such as Egh which has the same rank h as the input, and which belongs to the emitter group such as GEg that has the same rank g as the switching distributor, each of the switching distributors also including a succession of outputs such as Xgk in which the outputs have ranks such as k, the switching distributor being controlled by said management member M when it receives a light wave via one of its inputs so that it transmits the wave via at least one of its outputs selected by the management member;

a group of said star distributors $C1, \ldots, Cn$ forming a succession in which they have ranks $1, \ldots, n$, each input such as $gCk$ of each of the star distributors such as Ck being connected to an output such as Xgk having the same rank k as the star distributor and belonging to a switching distributor such as Xg that has the same rank g as the input; and a set of filters $F1,1, \ldots, Fn,m$ constituted by a succession of said groups of filters $GF1, \ldots, GFn$ in which succession the groups have ranks $1, \ldots, n$, each filter such as $Fk,1$ in a group of filters such as GFk being connected to an output which has the same rank 1 as the filter, and which belongs to the star distributor such as Ck that has the same rank k as the group of filters.

Figure 4:
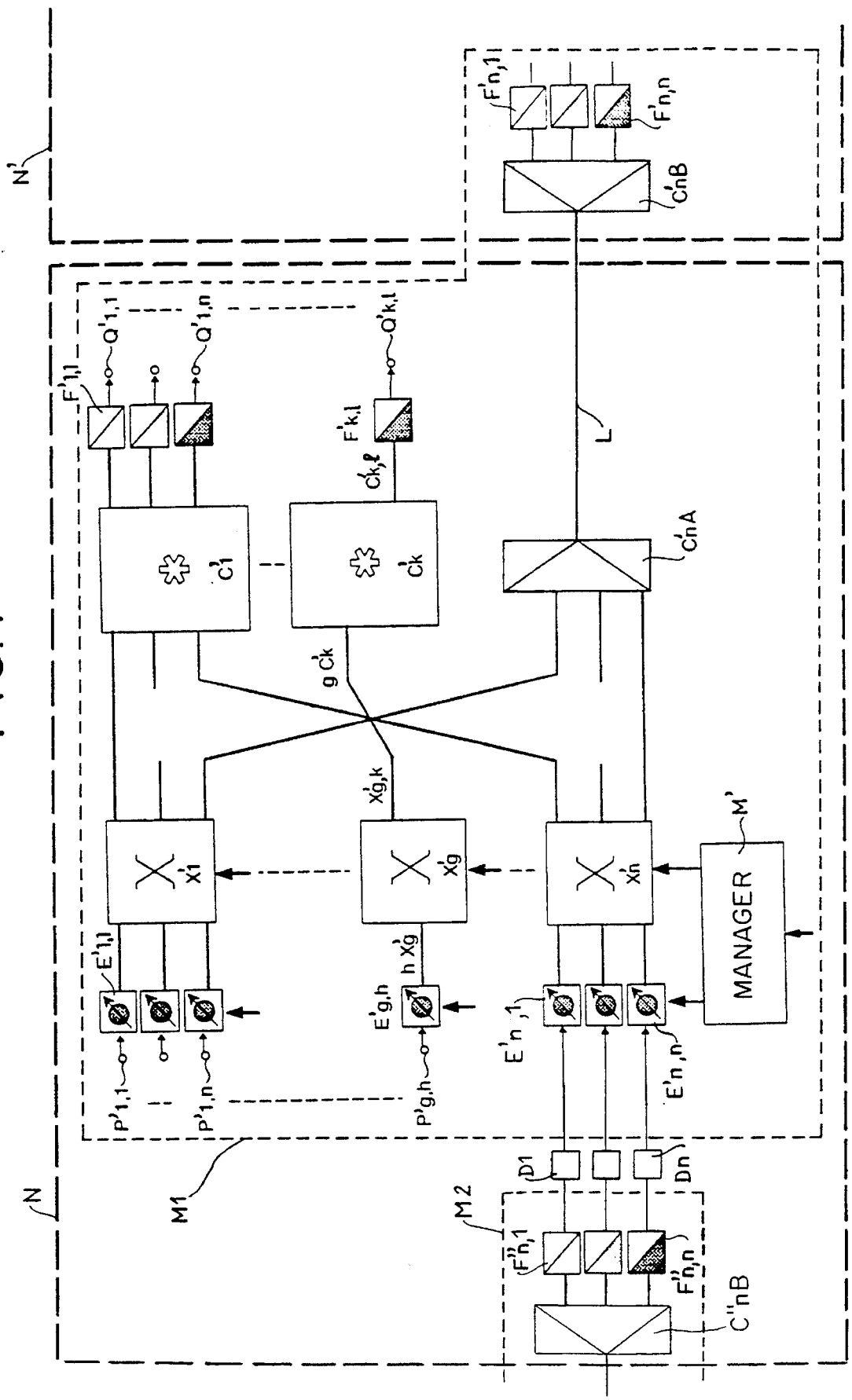
FIG. 4 shows a second matrix of the present invention, the members of the second matrix being distributed between two nodes of an optical telecommunications network.

In FIG. 4, the second matrix M1 of the invention belongs to a telecommunications network including a plurality of nodes such as N and N' that are remote from each other and that are connected together via link optical fibers such as L. The link fibers guide wavelength multiplexes, each of which is constituted by a plurality of waves having different wavelengths and carrying respective data. Furthermore, each node such as N has a plurality of inputs such as P'1,1 and P'g,h and a plurality of outputs such as Q'1,1 and Q'k,1 the inputs and outputs constituting local accesses for communicating with users connected to the node.

In matrix M1, the number m is equal to the number n. This matrix differs from the first matrix in that at least one of the star distributors, e.g. distributor Cn is replaced by the set comprising a multiplexer C'nA and a demultiplexer C'nB. The multiplexer C'nA belongs to a node N of the network.

The demultiplexer C'nB belongs to a following node N' of the network, and it is connected to the multiplexer C'nA via the link fiber L. The filters F'n,1, . . . ,F'n,m are included in the following node N'.

Node N further includes a demultiplexer (not shown) that is analogous to demultiplexer C'nB, and filters such as F"n,1,. . . ,F"n,n fed by the demultiplexer and belonging to another switching matrix M2, e.g. similar to matrix M1. The other members of the other matrix are included in a preceding node (not shown).

The signals supplied by the filters in optical form are put into electrical form by detectors D1, . . . , Dn which are provided with electronic circuits, in particular amplifiers, so as to modulate the waves supplied by the emitters E'n,1, . . . E'n,n.

It can be understood that, without going beyond the ambit of the invention, a switching matrix may be made that includes not only the above-described elements but also other elements that offer certain additional possibilities.

The invention claimed is:

1. A strictly blocking-free optical switching matrix using a succession of carrier wavelengths and including:

a management member (M);

a set of emitters (E1,1, . . . , Em,n) constituted by a succession of groups of emitters (GE1, GEm) in which succession said groups have ranks (1, . . . , m), each said group of emitters (GE1) being constituted by emitters (E1,1, . . . , E1,n) in succession and having ranks (1, . . . , n) in the group, each of said emitters being provided with an input (P1,1, . . . , P1,n) of the same rank for receiving data to be transmitted, the emitter being controlled by the data so as to emit a light wave carrying the data and having one of said carrier wavelengths constituting a wavelength of the emitter, which wavelength is controlled by said management member;

a group of switching distributors (X1, . . . , Xm) in succession, having ranks (1, . . . , m) in the group, each of said switching distributors (Xg) being capable of distributing said light waves, and including a succession of inputs (hXg) having ranks (h) in the succession, each switching distributor input being connected to a corresponding emitter (Egh) which has the same rank (h) as the input, and which belongs to the emitter group (GEg) that has the same rank (g) as the switching distributor, each of the switching distributors also including a succession of outputs (Xgk) in which the outputs have ranks (k), the switching distributor being controlled by said management member (M) when the switching distributor receives a light wave via one of said inputs so that the switching distributor transmits the wave via at least one of said outputs selected by the management member;

a group of star distributors (C1, . . . , Cn) forming a succession in which they have ranks (1, . . . , n), each star distributor (Ck) including a respective succession of inputs (gCk), each of which inputs has a rank (g) in the respective succession, and is connected to an output (Xgk) of the switching distributor having the same rank as the star distributor and belonging to a corresponding switching distributor (Xg) that has the same rank (g) as said each input for receiving a light wave therefrom, each said star distributor forming a mixture of all said light waves received by said inputs of said star distributor, each said star distributor also including a succession of outputs (Ck,l), each of said outputs of each said star distributor having a rank (l) in the respective succession and transmitting a group of waves constituted by a fraction of said mixture; and a set of filters (F1,1, . . . , Fn,m) constituted by a succession of groups of filters (GF1, . . . .GFn) in which the groups of filters have ranks (1, . . . , n), each group of filters (GF1) being constituted by filters F1,1, . . . F1,m) in succession and having ranks (1, . . . , m) in the group, each of the filters having a wavelength constituted by one of said carrier wavelengths for selective transmitting waves having said wavelength of the filter, each filter (Fk,1) in a group of filters (GFk) being connected to an output of one said star distributors which has the same rank (1) as the filter, and which belongs to a said star distributor (Ck) that has the same rank (k) as the group of filters.

2. A matrix according to claim 1, wherein:

at least one of said star distributors is constituted by a wavelength multiplexer (C'nA) connected via a link fiber (L) to a demultiplexer (C'nB) remote from the multiplexer;

said set of emitters (E'1,1, . . . , E'n,n), said switching distributors (X'1, . . . , X'n), and the multiplexer are included in a node (N) of a telecommunications network;

the demultiplexer and the filters (F'n1, . . . , F'n,n) connected to the demultiplexer are included in another node (N') of the network; and the two nodes (N,N') are connected together via the link fiber.

3. A strictly blocking-free optical switching matrix using a predefined set of carrier wavelengths and comprising:

a management member, emitters, switching distributors, star distributors, and filters;

each of said emitters having a respective emitter input for receiving data to be transmitted and emitting, in response to said data, a light wave carrying said data and having a wavelength controlled by said management member, wherein said wavelength is one of said predefined set of carrier wavelengths;

each of said switching distributors having respective switching distributor inputs and respective switching distributor outputs;

each of said emitters being connected to a corresponding one of said switching distributor inputs, wherein emitters connected to respective switching distributor inputs of identical switching distributors define emitter groups, each of which corresponds to one of said switching distributors;

each of said switching distributors (1) distributing each said light wave of each of said emitters of said corresponding emitter group, and (2) being controlled by said management member (M) to transmit each said lightwave via one of said respective switching distributor outputs selected by said management member;

each of said star distributors having respective star distributor inputs and respective star distributor outputs;

each of said respective switching distributor outputs of one of said switching distributors being connected a corresponding star distributor input of a different star distributor;

each of said star distributors (1) forming a light wave mixture of each said light wave received at said respective star distributor inputs and (2) transmitting a fraction of said light wave mixture at each of said respective star distributor outputs;

each of said star distributor outputs being connected to a corresponding one of said filters, wherein filters connected to respective star distributor inputs of identical star distributors define corresponding filter groups, each of which corresponds to one of said star distributors; and each of said filters, within each of said filter groups, having a filter wavelength corresponding to a respectively different one of said predefined set of carrier wavelengths.

* * * * *